US010229777B2

(12) United States Patent
Zou et al.

(10) Patent No.: US 10,229,777 B2
(45) Date of Patent: Mar. 12, 2019

(54) GRADED MAGNETIC COMPONENT AND METHOD OF FORMING

(71) Applicant: General Electric Company, Schenectady, NY (US)

(72) Inventors: Min Zou, Niskayuna, NY (US); Francis Johnson, Clifton Park, NY (US); Patel Bhageerath Reddy, Niskayuna, NY (US); James Pellegrino Alexander, Ballston Lake, NY (US); Ayman Mohamed Fawzi EL-Refaie, Niskayuna, NY (US); Wanming Zhang, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 143 days.

(21) Appl. No.: 15/078,516

(22) Filed: Mar. 23, 2016

(65) Prior Publication Data
US 2016/0203899 A1    Jul. 14, 2016

Related U.S. Application Data

(63) Continuation-in-part of application No. 14/068,937, filed on Oct. 31, 2013, now Pat. No. 9,634,549.

(51) Int. Cl.
*H01F 7/02* (2006.01)
*H01F 41/02* (2006.01)
(Continued)

(52) U.S. Cl.
CPC .............. *H01F 7/021* (2013.01); *B05D 7/14* (2013.01); *C22C 38/04* (2013.01); *C22C 38/30* (2013.01);
(Continued)

(58) Field of Classification Search
CPC ........ H01F 7/021; H01F 41/0253; B05D 7/14
(Continued)

(56) References Cited

U.S. PATENT DOCUMENTS

| 4,121,953 A | 10/1978 | Hull |
| 4,916,027 A | 4/1990 | Delmundo |

(Continued)

FOREIGN PATENT DOCUMENTS

| CN | 101645628 A | 2/2010 |
| JP | H0636664 B2 | 5/1994 |

(Continued)

OTHER PUBLICATIONS

J.W.Simmons, "Overview: High-Nitrogen Alloying of Stainless Steels", Materials Science and Engineering, Mar. 30, 1996, vol. 207, Issue 2, pp. 159-169.

(Continued)

*Primary Examiner* — John K Kim
(74) *Attorney, Agent, or Firm* — GE Global Patent Operation; Nitin N. Joshi (57) ABSTRACT

A magnetic component including at least one region is disclosed. The at least one region includes nitrogen and a concentration of the nitrogen in the at least one region is graded across a dimension of the at least one region. Further, a saturation magnetization in the at least one region is graded across the dimension of the at least one region. Further, a method of varying the magnetization values in at least one region of the magnetic component is disclosed.

6 Claims, 4 Drawing Sheets

(51) Int. Cl.
| | |
|---|---|
| *B05D 7/14* | (2006.01) |
| *C23C 8/04* | (2006.01) |
| *C23C 8/26* | (2006.01) |
| *H01F 1/147* | (2006.01) |
| *H02K 19/02* | (2006.01) |
| *H02K 1/02* | (2006.01) |
| *H02K 1/24* | (2006.01) |
| *C22C 38/04* | (2006.01) |
| *C22C 38/30* | (2006.01) |
| *C22C 38/38* | (2006.01) |
| *C21D 1/26* | (2006.01) |

(52) U.S. Cl.
CPC .............. *C22C 38/38* (2013.01); *C23C 8/04* (2013.01); *C23C 8/26* (2013.01); *H01F 1/147* (2013.01); *H01F 41/0253* (2013.01); *H02K 1/02* (2013.01); *H02K 1/246* (2013.01); *H02K 19/02* (2013.01); *C21D 1/26* (2013.01); *C21D 2221/00* (2013.01)

(58) Field of Classification Search
USPC ............................ 310/46; 335/302; 148/206
See application file for complete search history.

(56) References Cited

U.S. PATENT DOCUMENTS

| | | | | |
|---|---|---|---|---|
| 5,818,140 | A | 10/1998 | Vagati | |
| 6,080,245 | A * | 6/2000 | Uchida | B22F 9/04 148/103 |
| 6,245,441 | B1 | 6/2001 | Yokoyama et al. | |
| 6,255,005 | B1 * | 7/2001 | Yokoyama | C21D 6/004 148/120 |
| 6,261,361 | B1 * | 7/2001 | Iida | C30B 15/203 117/19 |
| 6,284,388 | B1 * | 9/2001 | Blotzer | C22C 38/008 148/112 |
| 6,468,365 | B1 * | 10/2002 | Uchida | H01F 1/0577 148/302 |
| 6,664,696 | B1 | 12/2003 | Pham et al. | |
| 7,377,986 | B2 * | 5/2008 | Schoen | C21D 8/1205 148/111 |
| 7,846,271 | B2 | 12/2010 | Choi et al. | |
| 9,803,139 | B1 | 10/2017 | Bonitatibus, Jr. et al. | |
| 2007/0017601 | A1 * | 1/2007 | Miyata | B22F 3/24 148/105 |
| 2011/0186191 | A1 * | 8/2011 | Murakami | C21D 8/0426 148/648 |
| 2012/0040840 | A1 | 2/2012 | Okayama et al. | |
| 2012/0288396 | A1 * | 11/2012 | Lee | C22C 38/04 420/74 |
| 2012/0315180 | A1 | 12/2012 | Soderman et al. | |
| 2013/0204018 | A1 * | 8/2013 | Parvulescu | B01J 29/7088 549/523 |
| 2014/0001906 | A1 | 1/2014 | Li et al. | |
| 2014/0062247 | A1 | 3/2014 | Dorfner et al. | |
| 2014/0239763 | A1 | 8/2014 | Raminosoa et al. | |
| 2014/0265708 | A1 | 9/2014 | Galioto et al. | |
| 2015/0054380 | A1 | 2/2015 | Suzuki | |
| 2015/0115749 | A1 | 4/2015 | Dial et al. | |
| 2016/0203898 | A1 | 7/2016 | Johnson et al. | |
| 2016/0203899 | A1 * | 7/2016 | Zou | H01F 7/021 335/302 |

FOREIGN PATENT DOCUMENTS

| | | |
|---|---|---|
| JP | 2000312446 A | 11/2000 |
| JP | 2002180215 A | 6/2002 |
| JP | 2008099360 A | 4/2008 |
| JP | 2015053823 A | 3/2015 |
| WO | 2008009706 A1 | 1/2008 |

OTHER PUBLICATIONS

Mita et al., "Magnetic Screw Rod Using Dual State 0.6C—13Cr—Fe Bulk Magnetic Material", Journal of Applied Physics, May 15, 2002, vol. 91, Issue 10, 4 Pages.

André Paulo Tschiptschin., "Predicting Microstructure Development During High Temperature Nitriding of Martensitic Stainless Steels Using Thermodynamic Modeling", Materials Research, http://www.scielo.br/pdf/mr/v5n3/v5n3a06, vol. 5, Issue 3,2002,pp. 257-262.

Mita et al., "Study of Internal Permanent Magnet Rotor Made of 0.6C—13Cr—Fe Dual State Magnetic Material", Journal of Applied Physics, May 15, 2003, vol. 93, No. 10, 4 Pages.

Mita et al., "A Study of Retainer Ring Made of 13.5Cr—0.6C—Fe Dual State Magnetic Material", Journal of Magnetism and Magnetic Materials, Jan. 2003, vols. 254-255, pp. 272-274.

Ju Hwan Oh et al., "New rotor shape design of SRM to reduce the torque ripple and improve the output power", Electrical Machines and Systems, 2005. ICEMS 2005. Proceedings of the Eighth International Conference on, vol. 1, Sep. 27-29, 2005, pp. 652-654.

Putatundaa et al., "Mechanical and Magnetic Properties of a New Austenitic Structural Steel", Materials Science and Engineering: A, http://www.sciencedirect.com/science/article/pii/S0921509305006489, vol. 406, Issue 1-2, Oct. 15, 2005, pp. 254-260.

Czerwiec et al., "Fundamental and Innovations in Plasma Assisted Diffusion of Nitrogen and Carbon in Austenitic Stainless Steels and Related Alloys", Plasma Processes and Polymers, Jul. 18, 2009, vol. 6, Issue 6-7, pp. 401-409.

Rudnizki et al., "Phase-Field Modeling of Austenite Formation from a Ferrite plus Pearlite Microstructure during Annealing of Cold-Rolled Dual-Phase Steel", Metallurgical & Materials Transactions, Aug. 2011, vol. 42, Issue 8, pp. 2516-2525.

Wan et al., "Analysis of Magnetism in High Nitrogen Austenitic Stainless Steel and Its Elimination by High Temperature Gas Nitriding", J. Mater. Sci. Technol, http://www.researchgate.netpublication/235666841_Analysis_of_Magnetism_in_High_Nitrogen_Austenitic_Stainless_Steel_and_Its_Elimination_by_High_Temperature_Gas_Nitriding, vol. 27, Issue 12, 2011,pp. 1139-1142.

Ghasaei et al., "Torque ripple reduction by multi-layering technique in an interior permanent magnet motor used in hybrid electric vehicle", Power Electronics, Electrical Drives, Automation and Motion (SPEEDAM), 2014 International Symposium on, Jun. 18-20, 2014, Ischia, pp. 372-377.

Search Report and Written Opinion from corresponding EP Application No. 171622343 dated Mar. 22, 2017, 6 Pages.

* cited by examiner

GRADED MAGNETIC COMPONENT AND METHOD OF FORMING

CROSS-REFERENCE TO RELATED APPLICATIONS

This application is a continuation-in-part of the co-pending U.S. patent application Ser. No. 14/068,937, entitled "DUAL PHASE MAGNETIC MATERIAL COMPONENT AND METHOD OF FORMING" filed on 31 Oct. 2013.

STATEMENT REGARDING FEDERALLY SPONSORED RESEARCH & DEVELOPMENT

This invention was made with Government support under contract number DE-EE0005573, awarded by the United States Department of Energy. The Government has certain rights in the invention.

BACKGROUND

Embodiments of the present disclosure relate generally to a magnetic component having at least one graded region and a method of forming the same. More particularly, the disclosure relates to a magnetic component including at least one region with a graded nitrogen content, and formation of the same by nitriding.

The need for high power density and high efficiency electrical machines, such as, for example, electric motors and generators has long been prevalent for a variety of applications, particularly for hybrid and/or electric vehicle traction applications. The current trend in hybrid/electric vehicle traction motor applications is to increase rotational speeds to increase the machine's power density, and hence reduce its mass and cost. However, it is recognized that when electrical machines are used for traction applications in hybrid/electric vehicles, there is a tradeoff between power density, efficiency, and the machine's constant power speed range. This tradeoff may present numerous design challenges.

Specifically, magnetic materials used in rotating electric machines generally serve multiple functions. Efficient coupling of magnetic fluxes to complementary poles across an air gap in the electric machines are desirable. Soft magnetic materials of the magnetic components may also bear a significant fraction of the mechanical and structural loads of the electric machine. Sometimes there may be tradeoffs between efficient magnetic utilization of the material and mechanical load bearing capability of the magnetic materials. Alternatively, sometimes speed rating of a machine may be lowered in order to allow a machine topology with efficient magnetic utilization. Therefore, it is desirable to have a material that can avoid the trade-offs between efficiency and operability of the electric machines by locally controlling the magnitude of the saturation magnetization of the soft magnetic material used in electric machines.

The power density of an electric machine may be increased by increasing the machine size, improving thermal management, increasing rotor speed, or by increasing the magnetic utilization. The magnetic utilization may be increased by using a combination of processing and alloying of a rotor lamination to create a multi-phase magnetic material by developing localized areas of high and low permeability. The localized areas of high and low permeability generally reduce flux losses during rotor operation. An abrupt change of saturation magnetization in the localized areas of high and low permeability of the machine may result in undesirable torque ripple in the electric machine.

A range of ferrous based soft magnetic compositions of the rotor lamination may be austenitized by a combination of processes to form regions of low permeability. This phase transformation at selected regions is normally thermally driven in the presence of carbides in the alloy. Upon local heating, the carbides that are present at selected locations dissolve in the matrix and depress the martensite start temperature, thereby aiding the stabilization of austenite regions at room temperature. However, the presence of carbides in a magnetic microstructure is known to increase coercivity and to lower the magnetic saturation, as compared to traditional ferrous-based magnetic steels. A different method of controlling the stabilization of the austenite phase at room temperature in different regions of the soft magnet, while starting from a substantially single phase microstructure, is desired to reduce torque ripple for a smooth motor operation. Embodiments of the present disclosure address these and other needs.

BRIEF DESCRIPTION

In accordance with one aspect of the disclosure, a magnetic component including at least one region is disclosed. The at least one region includes nitrogen and a concentration of the nitrogen in the at least one region is graded across a dimension of the at least one region. Further, a saturation magnetization in the at least one region is graded across the dimension of the at least one region.

In accordance with one aspect of the disclosure, a magnetic component including a first region, a second region, and a third region interposed between the first region and the second region is disclosed. A concentration of nitrogen in the first region is less than 0.1 wt % of the first region and a concentration of nitrogen in the second region is greater than 0.4 wt % of the second region, and wherein a concentration of nitrogen in the third region is substantially continuously graded across a dimension of the third region.

In accordance with another aspect of the disclosure, a method for varying magnetization values in at least one region of a magnetic component is disclosed. The method includes disposing a coating that includes a nitrogen stop-off material on at least one portion of the component to form a mask and heat-treating the component in a nitrogen-rich atmosphere at a temperature greater than 700° C. to form the at least one region in the magnetic component. The at least one region is characterized by a gradient in nitrogen content and a gradient in saturation magnetization across a dimension of the least one region.

BRIEF DESCRIPTION OF THE DRAWINGS

These and other features, aspects, and advantages of the present disclosure will become better understood when the following detailed description is read with reference to the accompanying drawings, in which like characters represent like parts throughout the drawings, wherein.

DETAILED DESCRIPTION

Different embodiments of the present disclosure relate to a magnetic component having a graded variation in nitrogen content and saturation magnetization in at least one region of the magnetic component, and a method of varying the saturation magnetization in at least one region of the magnetic component.

In some embodiments, a magnetic component is disclosed. The magnetic component described herein includes at least one region, where the at least one region is characterized by a nitrogen content that is graded across a dimension of the at least one region.

The term "magnetic component" as used herein refers to a magnetic part of any product, such as, for example, a rotor lamination of a motor. In some embodiments, the magnetic component is formed by a ferromagnetic material, in the size and shape required for the final application. The term "dimension" as used herein includes any length, width, thickness, any diagonal or non-diagonal directions, and volume. Thus, a parameter is considered to be "graded across a dimension" if the parameter is graded across the length, across the width, across the thickness, across any diagonal or non-diagonal directions, across a volume, or across any designed pattern.

Figure 1:
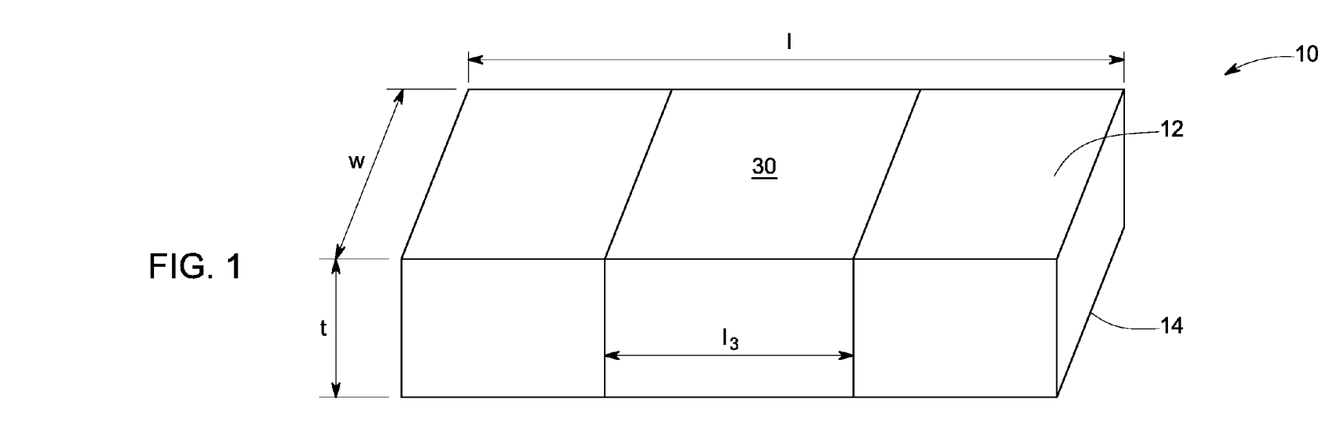
FIG. 1 illustrates a magnetic component, in accordance with some embodiments of the disclosure.

FIG. 1 illustrates a magnetic component 10 in accordance with some embodiments. The magnetic component 10 is usually formed from a composition having a carbon concentration less than 0.05 weight %, and may be of any shape and size. For ease of understanding herein, the magnetic component 10 is envisaged as having a rectangular shape having a top surface 12 and a bottom surface 14.

In some embodiments, the magnetic component 10 may have a certain length (l), width (w), and thickness (t). The magnetic component 10 includes at least one region 30 that is characterized by a nitrogen content that is graded across a dimension (not shown) of the region 30. Further, a saturation magnetization in the region 30 is graded across the dimension of the region 30. Non-limiting example of a dimension across which the nitrogen content may be graded includes the length (l). It should be noted that although the embodiments described herein below are described in the context of graded nitrogen content and saturation magnetization across the length, the present disclosure is not limited thereto. As mentioned earlier, additional variations, such as, for example, gradation of nitrogen content and saturation magnetization along the width w, thickness t, any diagonal or non-diagonal directions, or along the volume of the magnetic component 10 are within the scope of the present disclosure.

In some embodiments, a nitrogen content and saturation magnetization of the magnetic component 10 in a region 30 are graded across the length 13 of that region. As used herein, a parameter such as, for example, the nitrogen content or the saturation magnetization, across a length of a region is considered to be graded if there is a gradient in that parameter across the length of that region. The term "gradient" as used herein refers to a progressive change in a value of a parameter with a change in a specified direction. As used herein, the phrase "progressive change in a value of a parameter" refers to progressive increase or progressive decrease in the value of the parameter. Thus, the phrase "a gradient in a parameter across a length" refers to a progressive increase or a progressive decrease in the value of the parameter with a change in position across the length.

Figure 2:
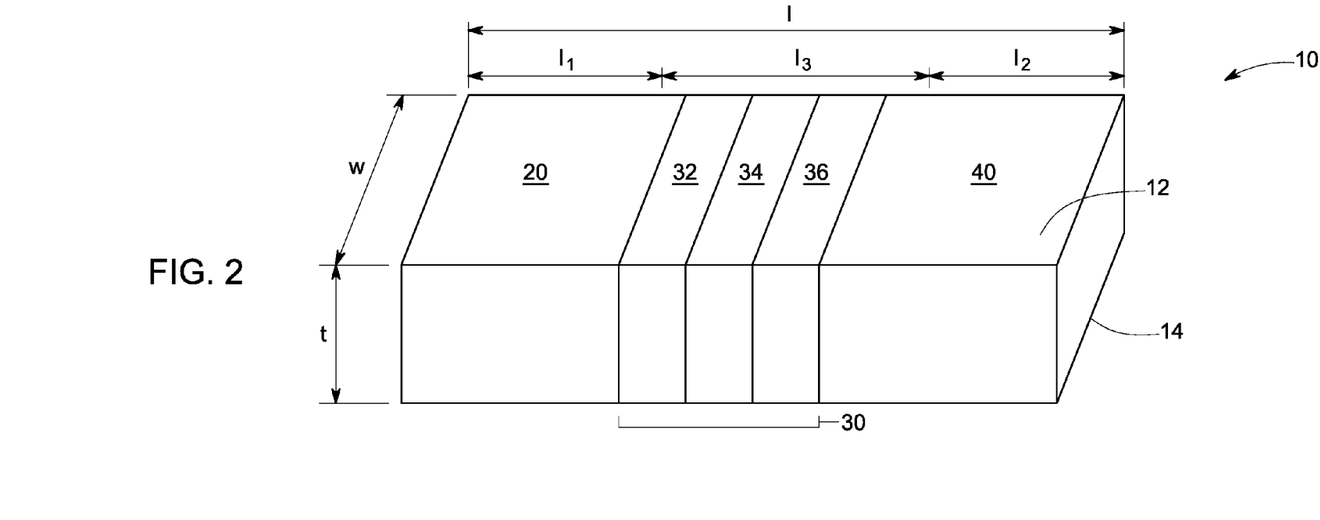
FIG. 2 illustrates a magnetic component, in accordance with some embodiments of the disclosure.

A region 30 is considered to be graded in nitrogen content along the length 13, if the nitrogen content of the region 30 is progressively increased or progressively decreased along the length 13. Thus, the region 30 is considered to be graded in nitrogen content along the length 13 of the region 30 if there is either an increase or decrease in the nitrogen content while moving along the length 13. The amount or value of change need not be constant through the length 13 of the region 30. Thus, even if there is a variation in the change in value of the nitrogen content along the length 13 of the region 30, the region 30 is considered to be graded if the change is unidirectional (i.e. progressive). For example, in some embodiments, if the region 30 has different portions 32, 34, and 36 along length 13 as shown in FIG. 2, the nitrogen content of the region 30 is considered to be graded if the nitrogen contents of the region 30 are in the order: nitrogen content of 32 is greater than the nitrogen content of 34, which is greater than the nitrogen content of 36; or nitrogen content of 32 is less than the nitrogen content of 34 and the nitrogen content of 34 is less than the nitrogen content of 36, regardless of the actual change in the value of the nitrogen content in these different portions of the region 30. Further, the "change" in a parameter as used herein is a measurable difference in the parameter using a commonly used device for measuring such a parameter. In some embodiments, the change in a parameter may be gradual, stepwise, or a combination thereof. In some embodiments, a concentration of nitrogen in the at least one region 30 is graded in a substantially continuous manner across the dimension of the region 30. As used herein, a change in a parameter is referred to be "substantially continuous manner across the dimension" if a line drawn using value of the parameter with respect to the position in the dimension has a constant, non-zero slope. In some embodiments, a value of change in a parameter is constant through the length 13 of the region 30.

The at least one region 30 may be magnetic, non-magnetic, or partially magnetic in some embodiments. Nitrogen content in a region is associated with a magnetism of that particular region and magnetism of a region increases with decreasing nitrogen content in that region. Thus, in some embodiments, a region is magnetic if a nitrogen content of that region is less than 0.1 weight % of an alloy composition of that region, and a region is non-magnetic if a nitrogen content of that region is greater than 0.4 weight % of an alloy composition of that region. Further, a region is partially magnetic if a nitrogen content is in a range from about 0.1 weight % to about 0.4 weight % of an alloy composition of that region.

As used herein, the term "magnetic region" refers to a region where greater than about 99 volume % of the region is magnetic, and in general, would act as a magnetic region. Further, the term "magnetic region" refers to a region having a relative permeability greater than 1. In some embodiments, the relative permeability of the magnetic region may be greater than 100, and in some embodiments, the relative permeability of the magnetic region may be greater than 200. In some embodiments, a saturation magnetization of the magnetic region is greater than 1.5 Tesla. In some of the further embodiments, a saturation magnetization of the magnetic region is greater than 1.8 Tesla.

As used herein, the term "non-magnetic region" refers to a region where greater than 90 volume % of the region is non-magnetic, and in general, would act as a non-magnetic region. Further, the term "non-magnetic region" refers to a region having a relative permeability approximately equal to 1. In some embodiments, a saturation magnetization of the non-magnetic region is about zero.

As used herein, the term "partially-magnetic region" refers to a region where from about 10 volume % to about 99 volume % of the region has a magnetic phase, and, in general, would act as a magnetic region with a relative permeability greater than 1. In some embodiments, a saturation magnetization of the partially-magnetic phase is in a region from about 0.01 to about 1.5 Tesla. In some embodiments, a saturation magnetization of the partially-magnetic region is in a range from about 0.5 to about 1.5 Tesla.

In some embodiments, the region 30 is magnetic and has a graded nitrogen content and saturation magnetization. In some of these embodiments, the nitrogen content of the magnetic region 30 is less than 0.1% of the region 30, and is graded along the length 13. In some embodiments, the saturation magnetization of the magnetic region 30 is greater than 1.5T, and is graded along the length 13.

In some embodiments, the region 30 is non-magnetic and has a graded nitrogen content and saturation magnetization. In some of these embodiments, the nitrogen content of the non-magnetic region 30 is greater than 0.4% of the region 30, and is graded along the length 13. In some embodiments, the saturation magnetization of the non-magnetic region 30 is less than 0.5T, and is graded along the length 13.

In some embodiments, the region 30 is partially-magnetic and has a graded nitrogen content and saturation magnetization. In some of these embodiments, the nitrogen content of the partially-magnetic region 30 is in a range from about 0.1% to about 0.4% of the region 30, and is graded along the length 13. In some embodiments, the saturation magnetization of the partially-magnetic region 30 is in a range from about 0.5T to about 1.5T and is graded along the length 13.

In some embodiments, the region 30 includes a plurality of portions such that at least one portion is magnetic or partially magnetic.

In some embodiments, the region 30 includes a first portion having a nitrogen content less than 0.1 weight % of the first portion. For example, in some embodiments, the portion 32 of the region 30 (FIG. 2) may have a nitrogen content less than 0.1 weight % of the portion 32, and is magnetic having a saturation magnetization greater than 1.5T.

In some embodiments, the region 30 includes a second portion having a nitrogen content greater than 0.4 weight % of the second portion. For example, in some embodiments, the portion 36 of the region 30 may have a nitrogen content greater than 0.4 weight % of the portion 36, and is non-magnetic having a saturation magnetization less than 0.5T.

In some embodiments, the region 30 includes a first portion having a nitrogen content less than 0.1 weight % of the first portion and a second portion having a nitrogen content greater than 0.4 weight % of the second portion the region 30.

In some embodiments, the region 30 further includes a third portion having a nitrogen content in a range from about 0.1% to about 0.4% of the third portion. For example, in some embodiments, the portion 34 of the region 30 may have a nitrogen content in a range from about 0.1% to about 0.4% of the portion 34, and is partially magnetic having a saturation magnetization in a range from about 0.5T to about 1.5 T.

In some embodiments, the region 30 includes a first portion having a nitrogen content less than 0.1 weight % of the first portion, a second portion having a nitrogen content greater than 0.4 weight % of the second portion, and a third portion having a nitrogen content in a range from about 0.1% to about 0.4% of the third portion.

In some embodiments, the magnetic component 10 includes the at least one region 30, and further includes a first region 20 with a length 11, as illustrated in FIG. 2. In some embodiments, a nitrogen content of the first region 20 is less than 0.1 weight % of the first region 20, and a nitrogen content of the region 30 is in the range from about 0.1 weight % to about 0.4 weight % of the region 30. In some of these embodiments, the nitrogen content in the first region 20 may or may not be graded. Thus, in some embodiments, the nitrogen content in the first region 20 is constant and the nitrogen content in the region 30 is graded. In some other embodiments, both the nitrogen content in the first region 20 and the nitrogen content in the region 30 are graded. In some of these embodiments, the first region 20 is magnetic, and the region 30 is partially-magnetic. In some embodiments, the region 30 has a continuous increase in nitrogen content and a continuous decrease in the saturation magnetization along the length 13 of the region 30 starting from the first region 20, and in a direction away from the first region 20.

In some embodiments, the magnetic component 10 includes the at least one region 30, and further includes a second region 40, with a length 12. In some embodiments, a nitrogen content of the second region 40 is greater than 0.4 weight % of the second region 40, and a nitrogen content of the region 30 is in the range from about 0.1 weight % to about 0.4 weight % of the region 30. In some of these embodiments, the nitrogen content in the second region 40 may or may not be graded. Thus, in some embodiments, the nitrogen content in the second region 40 is constant and the nitrogen content in the region 30 is graded. In some other embodiments, both the nitrogen content in the second region 40 and the nitrogen content in the region 30 are graded. In some of these embodiments, the second region 40 is non-magnetic, and the region 30 is partially-magnetic. In some embodiments, the region 30 has a continuous decrease in nitrogen content and a continuous increase in the saturation magnetization along the length 13 of the region 30 starting from the second region 40, and in a direction away from the second region 40.

In some embodiments, the magnetic component 10 includes the at least one region 30, the first region 20 and the second region 40, wherein the at least one region 30 is interposed between the first region 20 and the second region 40, as illustrated in FIG. 2. In some embodiments, a nitrogen content of the first region 20 is less than 0.1 weight % of the first region 20, a nitrogen content of the region 30 is in the range from about 0.1 weight % to about 0.4 weight % of the second region 40, and a nitrogen content of the second region 40 is greater than 0.4 weight % of the second region 40. In some of these embodiments, the nitrogen content in the first region 20 and the second region 40 may or may not be graded. Thus, in some embodiments, the nitrogen content in the first region 20 and the nitrogen content in the second region 40 are constant and the nitrogen content in the region 30 is graded. In some other embodiments, the nitrogen content in the first region 20, the nitrogen content in the region 30, and the nitrogen content in the second region 40 are graded. In some alternate embodiments, the nitrogen content in the first region 20, and the nitrogen content in the region 30 are graded, and the nitrogen content in the second region 40 is constant. In certain embodiments, the nitrogen content in the first region 20 is constant, and the nitrogen content in the region 30 and the nitrogen content in the second region 40 are graded. In some of these embodiments, a saturation magnetization of the first region 20 is greater than a saturation magnetization of the region 30, and the saturation magnetization of the region 30 is greater than a saturation magnetization of second region. In some embodiments, the first region 20 is magnetic, the region 30 is partially-magnetic, and the second region 40 is non-magnetic. In some embodiments, the region 30 has a continuous increase in nitrogen content and a continuous decrease in the saturation magnetization along the length l3 of the region 30 starting from the first region 20 up to the second region 40, and in a direction away from the first region 20 and towards the second region 40.

In certain embodiments, the magnetic component 10 includes a first region 20, a second region 40, and a third region 30 interposed between the first region 20 and the second region 40, wherein a concentration of nitrogen in the first region 20 is less than 0.1 wt % of the first region and a concentration of nitrogen in the second region 40 is greater than 0.4 wt % of the second region, and wherein a concentration of nitrogen in the third region 30 is substantially continuously graded across a dimension of the third region 30. A magnetic component, according to some embodiments, may include any number of first regions 20, the second regions 40, and third regions 30 of any dimension and shape in any parts of the magnetic component. In some embodiments, the magnetic component 10 includes a plurality of first regions 20, a plurality of second regions 40, and a plurality of third regions 30 in the vicinity of each other.

In some embodiments, the first, second, and the third regions may be located adjacent to one another, or may be separated from one another. For example, in certain embodiments, the magnetic component includes a plurality of first, second and third regions, where the partially magnetic regions are disposed in between the magnetic and non-magnetic regions. In these embodiments, the magnetic and non-magnetic regions are separated from each other, and the partially magnetic regions are adjacent to magnetic and non-magnetic regions.

In the embodiments illustrated in FIG. 2, the first region 20, the second region 40, and the third region 30 are illustrated as being disposed adjacent to each other. However, embodiments in which the first, second, and third regions are disposed in a random manner throughout the volume of the magnetic component are also within the scope of the present specification.

It should be noted that FIGS. 1 and 2 are only for illustration purposes, and although the size and shape of the first, second, and third regions is illustrated to be substantially similar, the shape and size of the regions may vary. For example, the first, second, and third regions illustrated in FIG. 2 need not always be rectangular and along the length (l) of the magnetic component 10, or along the width (w), or thickness (t) of the magnetic component 10. Further, the magnetic component 10 may be designed such that the different first regions of a plurality of first regions may have same or different shapes, length (l1), width (w1), and thickness (t1) values. For example, a shape (not specifically illustrated), length (l1), width (w1), and thickness (t1) of the first region 20 may be same as, or different from, the shape, length (l2), width (w2), and thickness (t2) respectively, of the second region 40 and the at least one region 30.

Presence of regions having a gradient in saturation magnetization in a motor component enables reduction in torque ripple and precise control in distribution of magnetic flux through the volume of an electrical machine. The magnetic flux density within the machine may be highest in magnetic regions, lower in the partially-magnetic regions, and lowest in the non-magnetic regions. Additionally, partially-magnetic and non-magnetic regions may aid in securing the high saturation magnetization regions together and retaining the mechanical integrity of the machine during operation. Further, the presence of multiple regions of different saturation magnetizations distributed gradually throughout the volume of the machine enables a machine designer to control distribution of magnetic flux within the machine.

In some embodiments, the magnetic component 10 is in a monolithic form. As used herein the term "monolithic form" refers to a continuous structure that is substantially free of any joints. In some embodiments, the monolithic magnetic component may be formed as one structure during processing, without any brazing or multiple sintering steps. When the magnetic component is made using a single material, the negative effects of bonding different regions are reduced by ensuring reliability, hermeticity, and increased bond strength of the magnetic component 10.

In some embodiments, a monolithic magnetic component may be manufactured by additive manufacturing. In some embodiments, a magnetic component is manufactured as a monolithic structure, prior to any sintering step. In certain embodiments, the monolithic magnetic component in its entirety is manufactured using a powder having the same composition as the starting material.

Thus, in some embodiments, the magnetic component 10 may be prepared from a single material. As an example, the magnetic component may be prepared from a starting material including a magnetic material. The magnetic material used herein may be a single element, an alloy, a composite, or any combinations thereof. In some embodiments, the magnetic component may include an iron-based alloy.

As disclosed earlier, in some embodiments, a nitrogen content in a region within a magnetic component is associated with a magnetism of that particular region. In some embodiments, an association of magnetism of a region with the nitrogen content in that region may vary depending on the composition of the alloy used to form the magnetic component, due to the difference in nitrogen solubility as determined by alloy composition. Thus, in some embodiments, a maximum nitrogen content that can be included in a magnetic region for one ferrous alloy may be different from the maximum nitrogen content that can be included in a magnetic region of another ferrous alloy of different composition. Further, the range of nitrogen contents that may be included to form the partially-magnetic regions in the two ferrous alloys of different compositions may be different and a minimum nitrogen content that can be included to form a non-magnetic region in two different ferrous alloys may vary depending on the compositions of the two ferrous alloys.

In some embodiments, the iron-based alloy may further include chromium, manganese, or a combination thereof. In some embodiments, the iron-based alloy may have a ferrite or martensitic structure. In some embodiments, the iron-based alloy has a composition of 20 weight % chromium and 5% manganese with the balance being substantially iron. In some embodiments, part of the iron may be substituted with up to 35 weight % cobalt. In some embodiments, part of chromium may be substituted with up to 5 weight % aluminum. In some embodiments, part of the iron may substitute with up to 35 weight % cobalt and part of chromium may be substituted with up to 5 weight % aluminum. In some embodiments, the magnetic region of this alloy has a nitrogen content less than 0.1 weight % of that region, a non-magnetic region has a nitrogen content that is greater than 0.4 weight % of that region, and a partially-magnetic region has a graded nitrogen content in a range from about 0.1 weight % to about 0.4 weight % of that region. As discussed previously, conversion of ferrite or martensitic structures into an austenite structure increases non-magnetic and partially-magnetic phases in this alloy.

Austenite, also known as gamma phase iron (γ-Fe), is a metallic, paramagnetic allotrope of iron. Heating the iron, iron-based metal, or steel to a temperature at which it changes crystal structure from ferrite to austenite is called austenitization. In some embodiments, austenitization may be carried out by adding certain alloying elements. For example, in some embodiments, addition of certain alloying elements, such as manganese, nickel, cobalt, and carbon, may stabilize the austenitic structure even at room temperature. A selected region may be made partially-magnetic by stabilizing austenite at room temperature at parts of the selected region. Further, a multi-phase magnetic component may be formed by stabilizing austenite at room temperature, in some regions of the magnetic component, while retaining some of the strongly ferromagnetic martensite or ferrite phases at some other regions of the magnetic component.

The presence of carbon is known to stabilize the non-magnetic austenite structure. Earlier efforts had been directed at dissolving formed carbides in selected regions of the magnetic component to stabilize non-magnetic phases at those regions of the magnetic component. In some embodiments, a partially-magnetic region of the magnetic component is formed by stabilizing a low permeability austenite structures, by the addition of nitrogen, rather than carbon. Carbides, as second phases, are known to be undesirable for the magnetic component. Thus, in some embodiments, the magnetic component is substantially free of carbon.

However, in other embodiments of the disclosure, the magnetic component may contain a relatively small level of carbon, which can sometimes increase the tensile strength of the magnetic component. In these embodiments, the total amount of carbon in all regions of the magnetic component may be less than about 0.05 weight %. In some embodiments, as described above, the magnetic component 10 has at least one region 30, where a concentration of nitrogen in the region 30 is graded across the length of the region 30. In some embodiments, a concentration of carbon in the region 30 of the magnetic component 10 is less than 0.05 weight % of the region 30.

In some embodiments, a method of manufacturing a magnetic component 10 is disclosed. Thermodynamic and empirical calculations may be used to predict magnetic component 10 compositions that upon the addition of nitrogen at elevated temperatures form the austenite phase. A magnetic component 10 using the designed alloy composition may be manufactured by using the traditional methods. In some embodiments, the magnetic component thus manufactured, in a near-final form, is subjected to graded nitriding, without the need to substantially alter the shape and size of the formed magnetic component after nitriding. As used herein the term "graded nitriding" is the controlled nitriding of some (desired) portions in a region of the magnetic component that provides a gradation in the nitrogen content in the region, without substantially altering the ferromagnetic nature of the nearby regions. The ferromagnetic nature of a nearby region may be considered to be "substantially altered", if the average saturation magnetization of the nearby region is reduced by more than about 5 volume % of that region.

The magnetic component may be engineered to have desired nitrogen solubility, prior to nitriding, and regions of different saturation magnetization may be realized by graded nitriding. The saturation magnetization of the final magnetic component may be a fraction of the saturation magnetization of the magnetic component before the step of nitriding. The saturation magnetization may differ throughout the volume of the final magnetic component due to graded variations in the processing conditions of the material.

The graded nitriding of the magnetic component may be attained by using different methods of nitriding. A graded block of chemical, physical, or mechanical nature may be provided to the regions of the magnetic component where the gradation in nitrogen content is desirable, to attain graded magnetism in the region. For example, a chemical composition that discourages nitrogen diffusion into the magnetic component may be used as a "nitrogen stop-off" material in a graded manner, at some regions. A physical method of introducing the nitrogen at selected portions in the at least one region, while making the nitrogen unavailable for the other portions, may be used. A mechanical block may be able to mechanically prevent the diffusion of the nitrogen at certain portions in the at least one region.

Thus, in some embodiments, a method of varying the (saturation) magnetization values in at least one region of a magnetic component is presented. As used herein the terms such as "varying" and "variation" refer to the progressive change in a value with a change in a specified direction, and do not refer to the time duration of the nitriding. The method includes disposing a coating that includes a nitrogen stop-off material on at least a portion of the magnetic component to form a mask, and heat-treating the magnetic component in a nitrogen-rich atmosphere to form the at least one region, where the at least one region has a gradient in nitrogen content and a gradient in saturation magnetization across the dimension of the region. The temperature of heat-treatment may be greater than 700° C. As used herein the term "nitrogen stop-off material" refers to a material that is capable of substantially stopping the nitrogen from entering into that region. It is not necessary that the stop-off material itself contains nitrogen. As the method includes graded introduction of nitrogen into the at least one region, the nitrogen content in the at least one region becomes graded in that region.

In some embodiments, a stencil may be used over the magnetic component to block some regions and expose other regions for the coating of nitrogen stop-off material. The coating material may be disposed on the magnetic component by using different methods. Non-limiting examples of methods for disposing the coating on the magnetic component may include dip coating, spray coating, spin coating, slip casting, tape casting and lamination, and gel casting. In certain embodiments, the coating is disposed by spray coating a nitrogen stop-off material in a slurry form over the magnetic component.

In some embodiments, regions that are designed to have graded magnetism are masked by the coating such that controlled, partial diffusion of nitrogen is permitted along different portions in the surface of the at least one region. In some embodiments, regions that are designed to be magnetic are masked such that nitrogen diffusion to those regions is avoided. Further, in some embodiments, the regions that are designed to be non-magnetic remain unmasked such that nitrogen diffuses into those regions.

Figure 3:
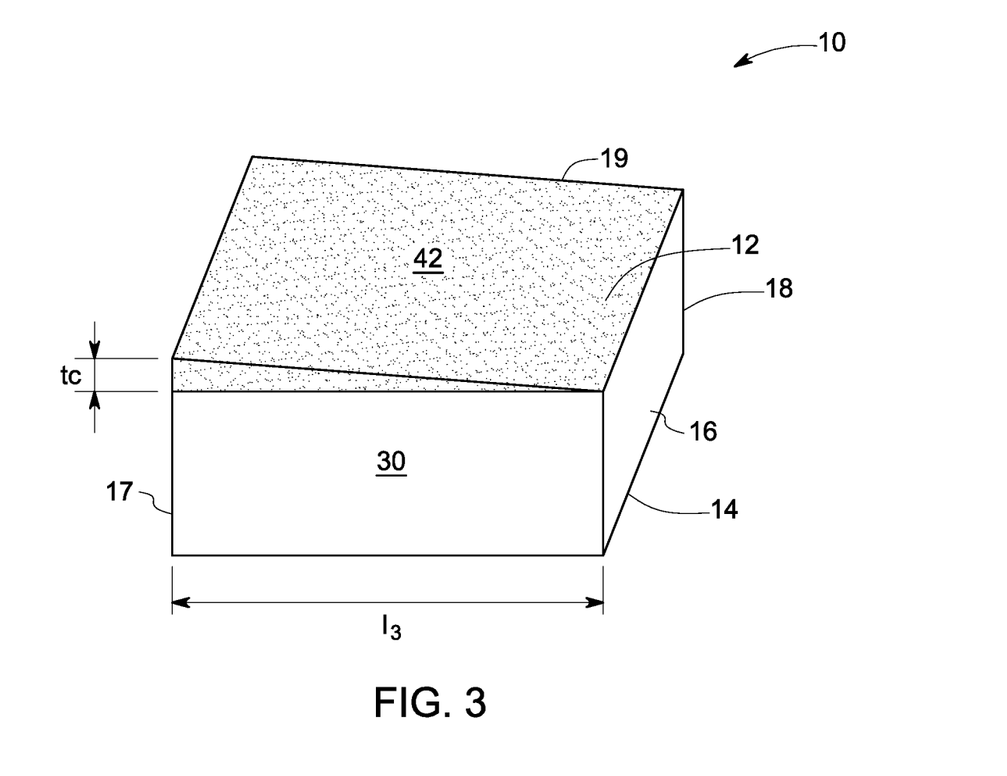
FIG. 3 illustrates a coating on a surface of a magnetic component, in accordance with some embodiments of the disclosure.

In some embodiments, the gradient in the nitrogen content in the at least one region is achieved by varying a coating parameter. The coating parameter includes, but is not limited to, one or more of a coating thickness, a coating density, and a surface coating area percentage. The variation in these coating parameters may be achieved by different methods. In some embodiments, the coating parameters may be varied by controlling a deposition parameter used for disposing the coating. Suitable deposition parameters, include, but are not limited to, deposition methods, material composition, solid loading, density, thickness of as-deposited coating, speed of deposition, drying methods, drying speed, sintering temperature, sintering time, and coating atmosphere. For example, in certain embodiments, a gradient in nitrogen content in the at least one region 30 may be achieved by disposing a coating having a graded thickness. Thus, by way of example, as illustrated in FIG. 3, a coating 42 with a thickness tc may be disposed over the at least one region 30. A gradient in thickness tc may be achieved by controlling the thickness during deposition of the coating or by selectively reducing the thickness of the coating after the deposition. The thickness tc of the coating 42 may be graded to vary the amount of nitrogen that diffuses in to the region 30. Thus, in some embodiments, the thickness tc of the coating 42 may be controlled such that different portions in the at least one region 30 have different nitrogen level and different saturation magnetization upon nitriding.

One skilled in the art would understand that depending on the shape and size of the required gradient in the at least one region 30, the coating 42 may be designed to have different shapes and characteristics.

Figure 4:
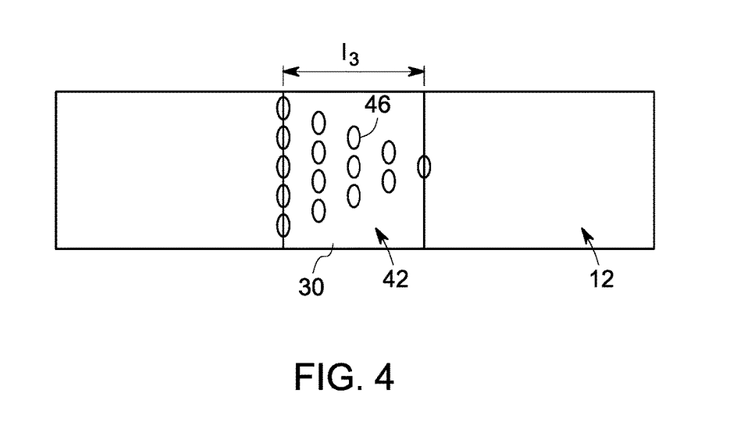
FIG. 4 shows a two-dimensional illustration of a mask configuration, in accordance with some embodiments of the disclosure.

As discussed above, in some embodiments, instead of varying thickness of the coating, a density or surface coating area percentage of the coating may be varied to control the diffusion of the nitrogen. For example, a coating having a lower density may allow higher amount of nitrogen to diffuse through, as compared to a dense coating. Thus, a variation in the density of the coating along the length 13 may help in forming a gradient in the nitrogen content, along the length 13 of the region 30. Further, if there is a variation in the surface coating area percentage (alternately percentage of area covered by the coating) in the at least one region 30 along the length 13 of the region 30, as illustrated in FIG. 4, the amount of nitrogen that diffuses in to the region 30 along the length 13 would be varied. In FIG. 4, the coating 42 is disposed on the top surface 12 of the region 30. The coating 42 has a plurality of openings 46 such that the nitrogen can diffuse inside the region 30 through these openings. By varying the number, shape, and size of the openings 46 in the coating 42, the amount of nitrogen that diffuses into the region 30 may be controlled and graded.

Figure 5:
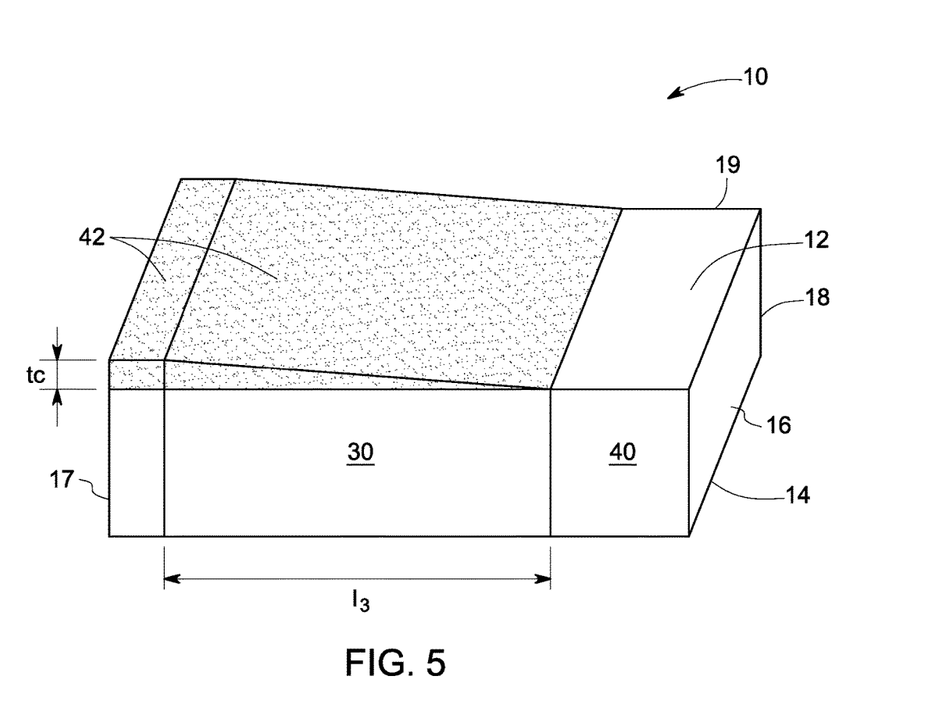
FIG. 5 illustrates a magnetic component, in accordance with some embodiments of the disclosure.

In some embodiments, the method of forming the magnetic component may include forming a first region 20, a second region 40, and the at least one region 30 in the magnetic component 10 wherein the at least one region 30 is interposed between the first region 20 and the second region 40 as illustrated in FIG. 5. In these embodiments, the first region 20 may be masked with a coating having the desired thickness, density, and surface area coverage such that the nitrogen is blocked from entering into the first region 20. The second region may be uncoated to allow maximum nitrogen diffusion into the second region 40, and the at least one region 30 may be partially blocked by varying one or more of the thickness, density, and surface coating area percentage of a coating, to permit the desired graded amount of nitrogen diffusion into the region 30. For example, a coating 42 with a thickness tc may be disposed over the first region 20 to retain the magnetism of the first region 20 and the second region 40 may be uncoated. A coating 42 having a gradient in thickness may be disposed on the at least one region 30 such that the amount of nitrogen that diffuses in to the at least one region 30 is graded. In some of these embodiments, the first region 20 has a saturation magnetization greater than the saturation magnetization of the at least one region 30, and the at least one region 30 has the saturation magnetization that is greater than a saturation magnetization of the second region 40.

In some embodiments, nitridation may be controlled such that the first region 20 has a nitrogen content less than 0.1 weight % of the first region 20, the second region 40 has a nitrogen content greater than 0.4 weight % of the second region 40, and the at least one region 30, interposed between the first region 20 and the second region 40, has a gradient in the nitrogen content that is in a range from about 0.1 weight % to about 0.4 weight % of the region 30. Further, a concentration of carbon in the at least one region 30 may be controlled to be less than 0.05 weight % of the region 30. In some embodiments, the first region 20 has a nitrogen content less than an average nitrogen content of the at least one region 30, and the at least one region 30 has an average nitrogen content that is less than a nitrogen content of the second region 40.

Figure 6:
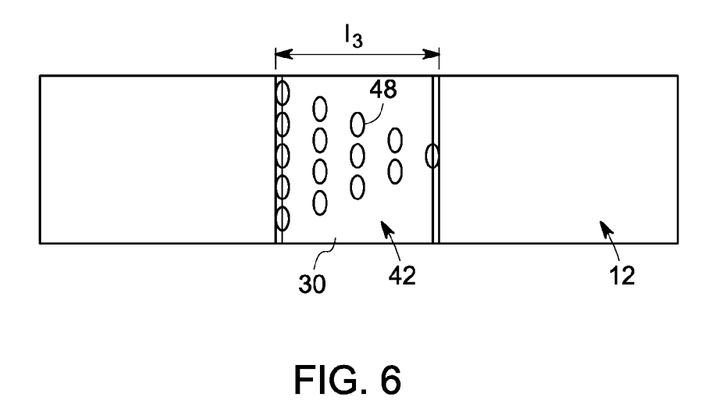
FIG. 6 shows a two-dimensional illustration of a mask configuration, in accordance with some embodiments of the disclosure.

In some embodiments, the gradient in nitrogen content in the at least one region 30 may be achieved by selectively removing portions of the coating 42 before the step of heat-treating, thus varying the surface coating area percentage or density of the coating in those regions as illustrated in FIG. 6. The portions of the coating 42 may be selectively removed by different methods including, but not limited to, etching and grit blasting.

In FIG. 6, a coating 42 is disposed on the top surface 12 of the region 30. A mask having a plurality of openings 48 (not illustrated) is disposed on the coated region 30. Portions of coating 42 that are unmasked may be removed by any suitable method such as grit blasting, to expose the top surface 12. Upon nitridation, an amount of nitrogen that diffuses in to the region 30 along the length 13 will therefore vary according to the variations in the size, shape and number density of the openings 48.

In some embodiments, a material, coating parameter, deposition parameter, or any combination thereof of the mask used while coating the nitrogen stop-off material or during selective removal of the nitrogen stop off material may be varied to achieve required gradation in the nitrogen content of the underneath region. Parameters such as, for example, composition, thickness, density, surface coating area percentage, edge coverage, angle of the edge coverage can be varied to dispose or remove desired size, shape, and density of the nitrogen stop-off material on a surface of the magnetic component. For example, a wax coating may be used as a mask during spray coating of a nitrogen stop-off material, where a wax coating with a low density may allow some nitrogen stop-off material to penetrate through the wax and coat on the surface. Further, a graded thickness at the edges of the mask may aid in forming a coating of nitrogen stop-off material with a graded thickness. The mask and nitrogen stop-off materials may be removed by mechanical forces, such as, for example, brushing off, after nitridation.

Nitriding may be carried out through a solid, liquid, gaseous, or plasma route. In some embodiments, elevated temperature gas nitriding is used to introduce nitrogen to the part. In certain embodiments, the elevated temperature gas nitriding includes heat-treating the magnetic component in a nitrogen atmosphere at an elevated temperature. Alternately, heat treatment in a mixture of ammonia and hydrogen may be used for nitrogen diffusion. The elevated temperatures in this technique allow for fast diffusion of nitrogen, providing a quick processing route. Alternately, plasma nitriding may be used for the nitrogen diffusion.

In some embodiments, nitrogen may be diffused into the magnetic component 10 through gas nitriding in a nitrogen-rich atmosphere, by heat-treating at a temperature greater than 700 degree Celsius (° C.). In some embodiments, gas nitriding is conducted by heat-treating at a temperature greater than 800° C.

In some embodiments, pressure used for gas nitriding is greater than 0.5 atmospheres (atm.). Generally, the diffusion of nitrogen is expected to increase with a higher heat-treatment temperature, and an increased equilibrium surface concentration of nitrogen. The increased pressure of the gases surrounding the magnetic component 10 often leads to an increased surface concentration of nitrogen. Therefore, at a given condition in a pure nitrogen atmosphere, a nitrogen pressure greater than the atmospheric pressure and a high temperature will generally provide a faster nitriding process. In some embodiments, an ambient pressure of greater than 1 atm. and a temperature greater than about 900° C. is used for nitriding. In a further embodiment, the temperature of nitriding is greater than 1000° C.

In some embodiments, a nitrogen-rich atmosphere is used for nitriding. In some embodiments, the nitrogen-rich atmosphere includes more than about 90% of nitrogen. In some embodiments, nitriding is conducted in a substantially pure nitrogen atmosphere. The substantially pure nitrogen atmosphere may be created by filling nitrogen in a furnace cavity after evacuating the air from the furnace cavity, and purging with nitrogen or through the continuous flow of nitrogen during processing. The coating may be applied on the component depending on the desired amount, pattern of nitrogen diffusion (and non-diffusion) for the magnetic component 10. The nitridation of the magnetic component 10 illustrated in FIG. 5 may occur through the surface portion of the at least one regions 30 on the top 12, bottom 14, and the front 17 and rear 19 surface portions of the magnetic component 10. If the at least one region 30 is an end portion of the magnetic component with the length l, then the nitridation of the region 30 may also happen through the side surfaces 17 and/or 19 of the magnetic component 10, as shown in FIG. 3.

When the magnetic components 10 illustrated in FIGS. 3-6 are subjected to gas nitriding, the nitrogen diffuses through the component, through uncoated (if any), and partially coated portions of all the faces of the magnetic component 10, including the top surface 12, bottom surface 14, and side surfaces 16, 17, 18 and 19 of the magnetic component. This diffused nitrogen, in conjunction with the composition of the magnetic component, changes the local phase stability in those regions, and converts those regions into non-magnetic austenite. Even though the nitrogen diffuses through the surface, the nitriding parameters allow the nitrogen to diffuse further into the length, width, and thickness of the magnetic component, through all the surfaces of the magnetic component 10, while the coated or partially coated regions prevent substantial nitrogen diffusion through those regions.

Through empirical and thermodynamic calculations, the parameters of nitriding may be adjusted, and the nitrogen diffusion at different directions may be predicted for certain regions of the magnetic component 10, and accordingly, the size, shape, thickness, and opening of the coating 42 may be altered so that the end product obtained is approximately the desired outcome of the nitriding process.

In some embodiments, the nitrogen diffusion into interior regions of the magnetic component may depend on the distance nitrogen travels inside the magnetic component 10. For example, if the nitridation is only through the top and bottom surfaces 12, and 14 respectively, the time duration required for the nitrogen diffusion into the inner parts of the magnetic component 10 may depend on the thickness t of the magnetic component 10. In some embodiments, the thickness of the magnetic component 10 is in a range from about 0.1 mm to about 5 mm. The desired pattern of the magnetic, non-magnetic, and partially-magnetic regions of this component may be obtained by diffusing the nitrogen through the selectively coated top surface 12 and bottom surface 14, keeping the side surfaces of the thickness t coated.

Different topologies may be presented, including multi-phase and graded magnetic materials described above and an electric machine including a magnetic component as described above may be manufactured. For example, internal permanent magnet machines, and induction machines may be designed with higher power density and improved power factor, and reduced torque ripple through pole shaping, and may be designed to have sensorless control. Switched reluctance machines may be designed to have lower windage losses at high speeds and further to reduce torque ripple. Synchronous reluctance machines may be designed to have higher power density, improved power factor, wider constant power speed range, lower torque ripple, and sensorless control.

Figure 7:
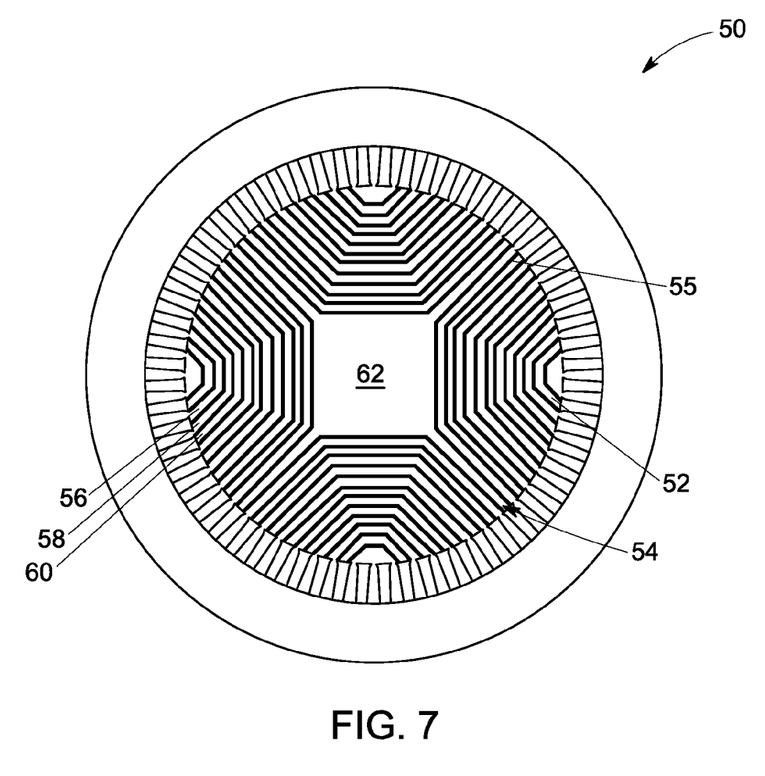
FIG. 7 illustrates a cross-sectional view of a multi-phase component, in accordance with some embodiments of the disclosure.

For example, a number of different types of synchronous reluctance machines, having a stator and a rotor shaft operationally disposed within the confines of the stator may be designed. FIG. 7 illustrates an example of a topology that could benefit from the multi-phase materials. The component 50 can represent a portion of the reluctance machine, including a magnetic region 52 and a partially-magnetic region 54 that has a gradient in saturation magnetization in between the two magnetic regions 52. These magnetic regions 52 and the graded, partially-magnetic regions 54 are collectively referred to as "laminated segments" below. The selectively shaped rotor 55 of the component 50 is configured as a four-pole machine. Each pole can include a plurality of the axially-extending, radially positioned ("stacked") laminated segments 56, 58, 60, and the like, which extend from each pole, terminating at a central rotor shaft 62. The number of poles, and the number of laminations, can vary greatly, depending on the particular design of the reluctance machine.

With continued reference to FIG. 7, the laminated segments effectively guide the magnetic flux into and out of the rotor 55. The magnetic regions 52 constrain the path of the magnetic flux, while the graded and partially-magnetic regions 54 ensure a relatively high density of magnetic flux lines coming out of the surface of the rotor with a smooth transition, and going into an air gap between the rotor and the stator. In manufacturing these types of reluctance machines according to conventional techniques, magnetic and partially-magnetic laminations usually had to be assembled by various mechanical/metalworking steps, e.g., cutting and welding. Inventors of the present application have discovered that the desired configurations of the machines obtained much more efficiently using the multi-phase materials and methods for making these, as described in some embodiments.

Different embodiments presented herein may enable a motor designer to precisely control the distribution of magnetic flux through the volume of an electrical machine. This may be achieved by designing regions of differential and graded saturation magnetization distributed throughout the volume of the machine. The magnetic flux density within the machine will be high in those regions which have higher saturation magnetization. Regions of lower saturation magnetization will still be available to retain the mechanical integrity of the machine, without causing high torque ripples.

This written description uses examples to describe the disclosure, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for varying magnetization values in at least one region of a magnetic component, comprising:
   disposing a coating on at least a portion of the magnetic component to form a mask, wherein the coating comprises a chemical composition that discourages nitrogen diffusion into the magnetic component; and
   heat-treating the magnetic component in a nitrogen-rich atmosphere at a temperature greater than 700° C. to form the at least one region in the magnetic component, wherein the at least one region is characterized by a gradient in nitrogen content and a gradient in saturation magnetization across a dimension of the at least one region, wherein the gradient in nitrogen content in the at least one region is achieved by varying a coating thickness.

2. The method of claim 1, wherein the coating thickness is varied by controlling a deposition parameter used for disposing the coating.

3. The method of claim 1, wherein the variation in the coating thickness in the at least one region is achieved by selectively removing portions of the coating before the step of heat-treating.

4. The method of claim 1, wherein a concentration of carbon in the at least one region is controlled to be less than about 0.05 weight % of the at least one region.

5. The method of claim 1, further comprising forming a first region and a second region in the magnetic component wherein the at least one region is interposed between the first region and the second region, and wherein the first region has a saturation magnetization greater than the saturation magnetization of the at least one region, and the at least one region has the saturation magnetization greater than a saturation magnetization of the second region.

6. The method of claim 5, wherein the first region has a nitrogen content less than the nitrogen content of the at least one region, and the at least one region has the nitrogen content less than a nitrogen content of the second region.

* * * * *